Sept. 15, 1931.     A. B. JOHNSON     1,823,200
WOODWORKING MACHINE
Filed Nov. 14, 1927     9 Sheets-Sheet 4

Inventor
ARTHUR B. JOHNSON
By Paul, Paul & Moore
ATTORNEYS

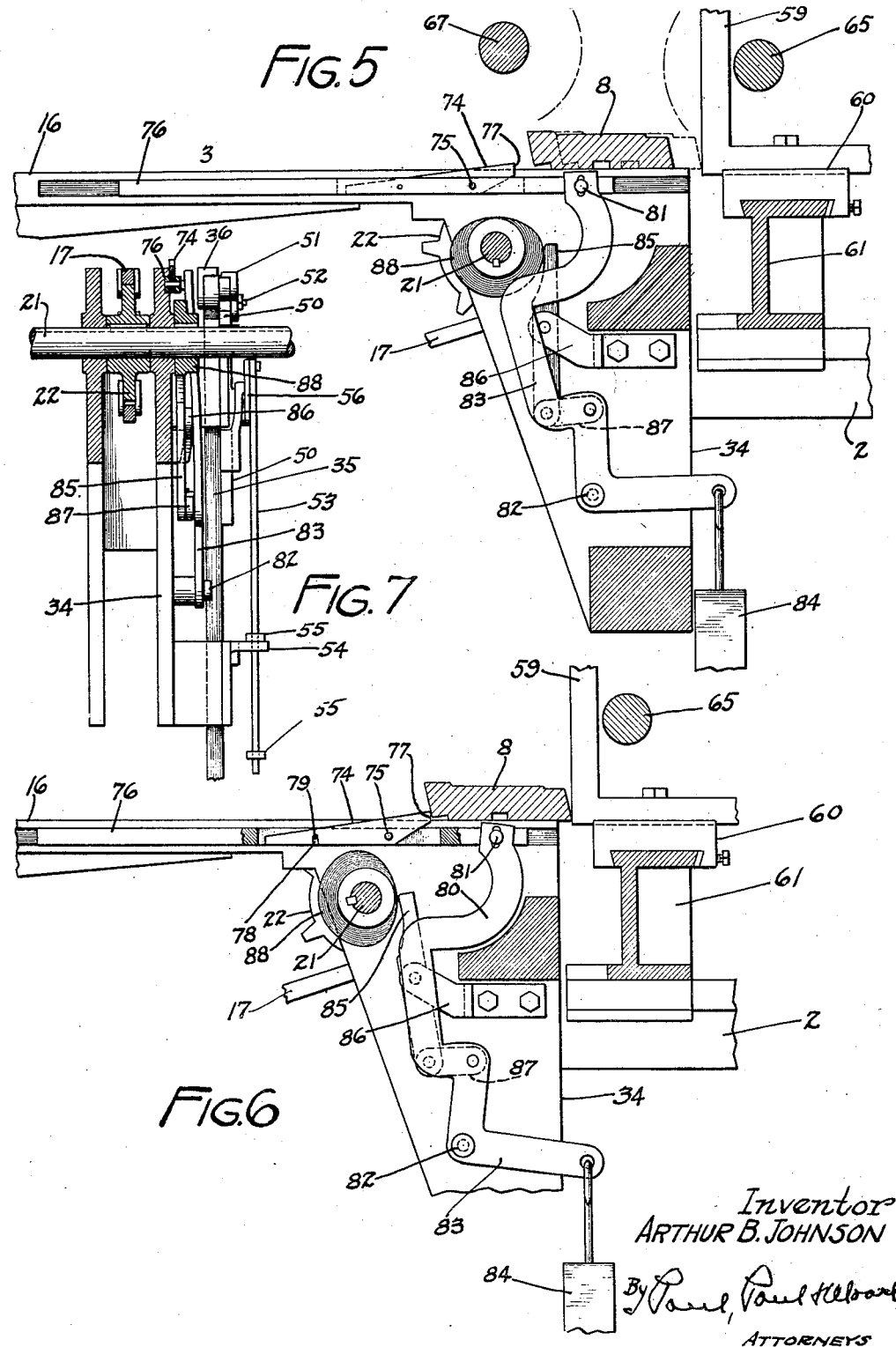

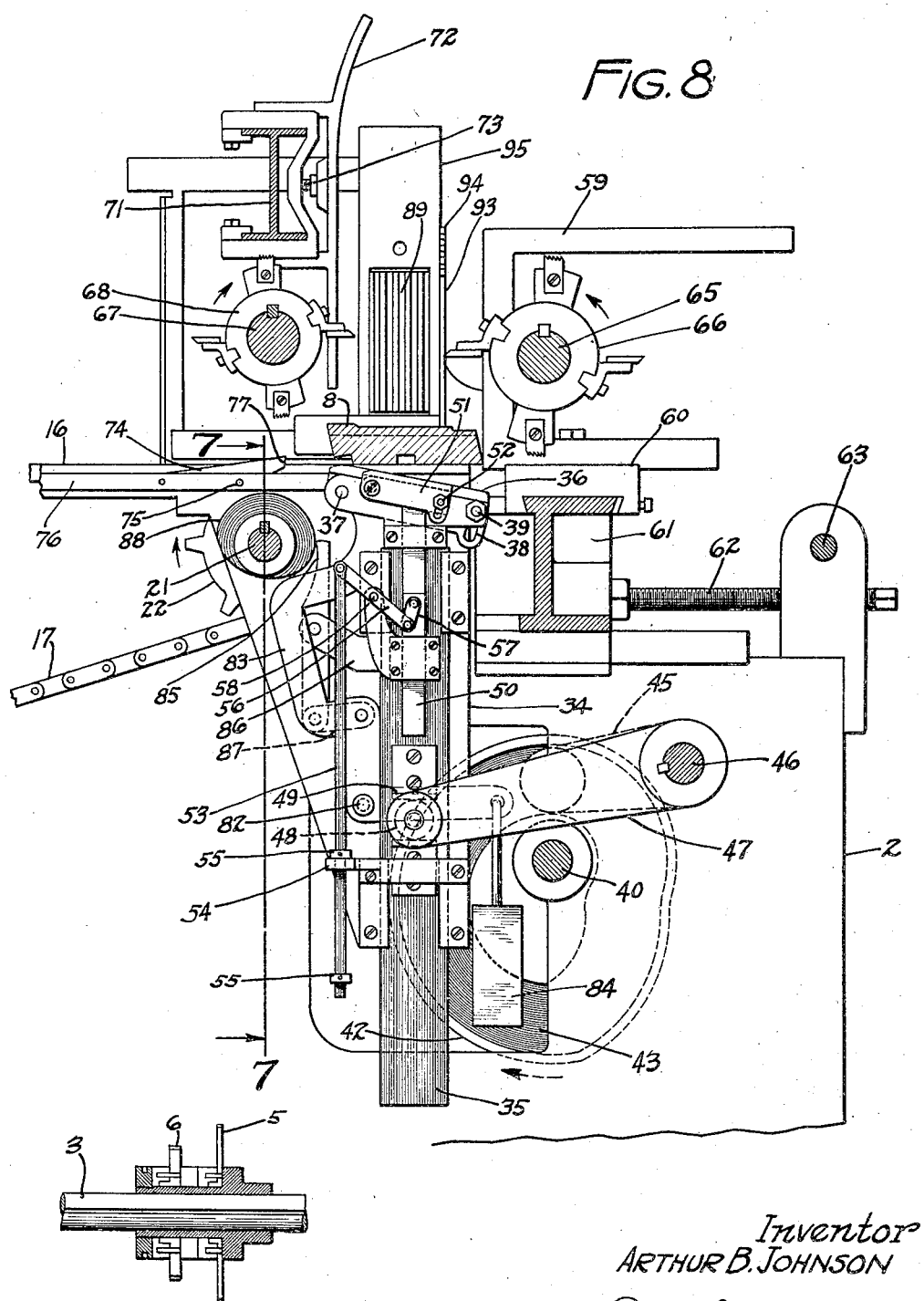

Sept. 15, 1931.  A. B. JOHNSON  1,823,200
WOODWORKING MACHINE
Filed Nov. 14, 1927    9 Sheets-Sheet 7
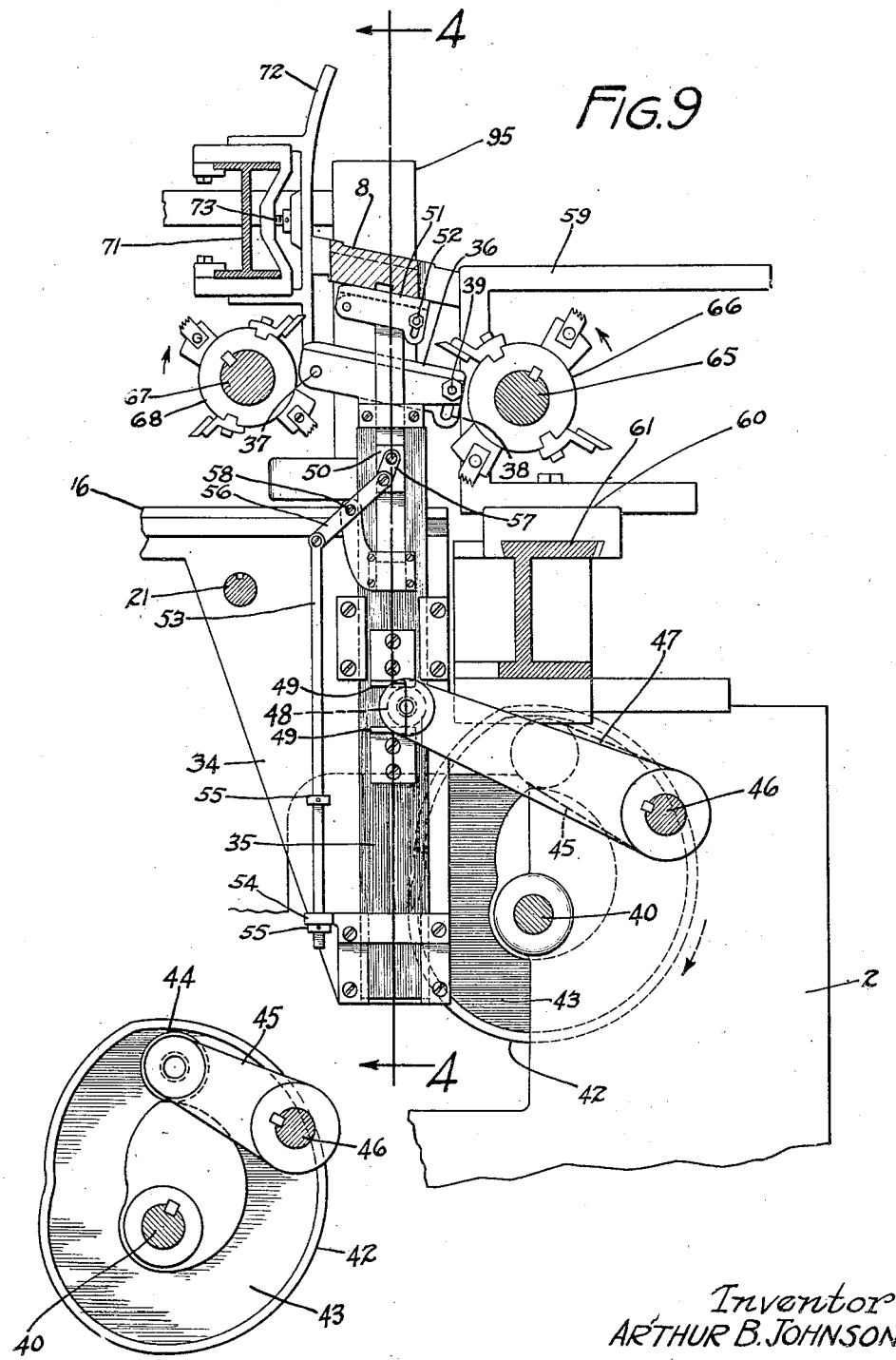
Inventor
ARTHUR B. JOHNSON
ATTORNEYS

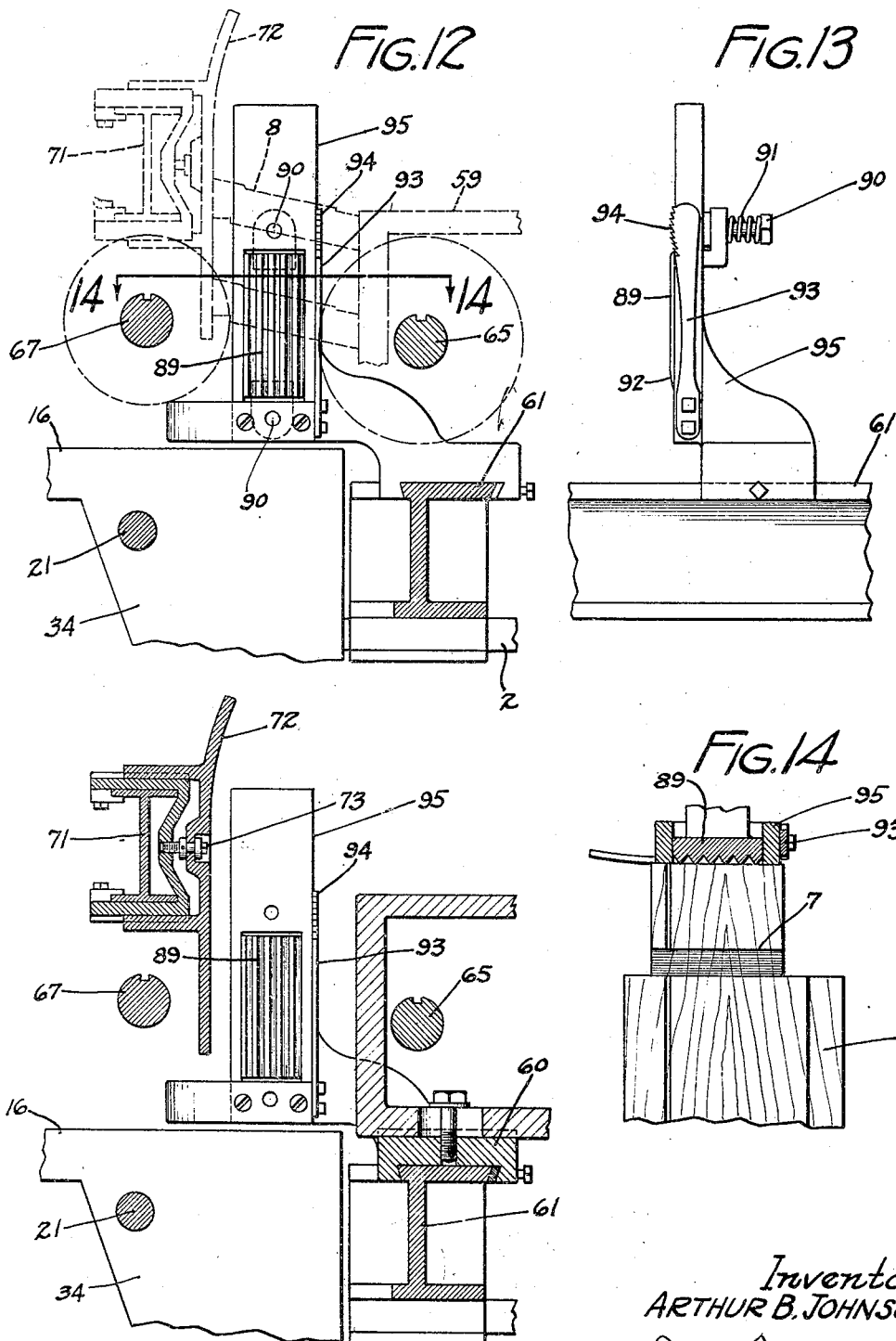

Sept. 15, 1931.  A. B. JOHNSON  1,823,200
WOODWORKING MACHINE
Filed Nov. 14, 1927  9 Sheets-Sheet 9

Inventor
ARTHUR B. JOHNSON
By Paul, Paul Moore
Attorneys

Patented Sept. 15, 1931

1,823,200

UNITED STATES PATENT OFFICE

ARTHUR B. JOHNSON, OF MINNEAPOLIS, MINNESOTA, ASSIGNOR TO ANDERSEN FRAME CORPORATION, OF BAYPORT, MINNESOTA, A CORPORATION OF WISCONSIN

WOODWORKING MACHINE

Application filed November 14, 1927. Serial No. 233,165.

In the manufacture of window sills and frames of various kinds it has been customary to provide what is known as a dadoing machine for cutting grooves of desired depth transversely in the sills or jambs and in wide windows or those of the mullion type it was customary to provide a number of these transverse grooves or recesses in the sills, generally referred to as dadoes. When these grooves or dadoes had been cut and it was desirable to provide notches intersecting the dadoes at right angles in the longitudinal edges of the sills, it has been the usual practice to feed the sills manually to a machine having suitable cutting edges by means of which the notches of the desired size and depth were formed. This manual operation tended to decrease the volume of production and increase the expense, as the sills had to be handled several times and it was necessary to exercise considerable care in feeding the work to the machine to insure the proper register of the notches in the edges of the sills with the dadoes running transversely thereof.

Evidently manufacturers of window frames are anxious to reduce the first cost and at the same time improve the finished article if possible and hence the primary object of this invention is to provide a machine adapted to receive the sills from the dado cutting heads and automatically perform the notching operation without any attention on the part of an operator, so that when the sills are discharged from the machine they will not only be suitably grooved or provided with dadoes but will also have the desired notches in their longitudinal edges suitably spaced apart and in exact alignment with the dadoes arranged at right angles thereto.

A further object is to provide a machine in which provision is made for suitable adjustment to adapt it for window sills of different length and for different forms of dadoes or notches therein, all to the end that the dadoing and notching may be more accurately and expeditiously performed and the production of the article greatly increased.

Other objects of the invention will appear from the following detailed description. The invention consists generally in various constructions and combinations, all as herein described and particularly pointed out in the claims.

In the accompanying drawings forming a part of this specification,

Figure 5 is a detailed sectional view showing the mechanism for handling the window sill preparatory to feeding it upwardly to the notching heads;

Figure 6 is a view similar to Figure 5 showing the mechanism in another step of the operation, the sill being clamped in position ready for its upward movement to the cutting heads;

Figure 7 is a detailed sectional view taken on the section line 7—7 of Figure 8 looking in the direction of the arrow;

Figure 8 is a vertical sectional view showing the operating mechanism in position to feed the sill upwardly to the cutting heads;

Figure 9 is a similar view showing the position assumed by the operating parts when the sill has been notched and has reached a position where it is clear of the notching heads;

Figure 10 is a detailed view of the cam through which the mechanism for feeding the sills vertically is operated;

Figure 11 is a detailed sectional view showing the guides for the vertically moving sill and the means for gripping the end of the sill;

Figure 12 is a similar view showing details of construction of the guides between which the sill is moved during the notching operation;

Figure 13 is a detailed view showing the means for preventing backward movement of the sills when discharged from the notching heads;

Figure 14 is a sectional view on the line 14—14 of Figure 12;

Figure 19 is a detailed sectional view showing the preferred manner of mounting dado cutting heads on their supporting shafts.

Figure 15:
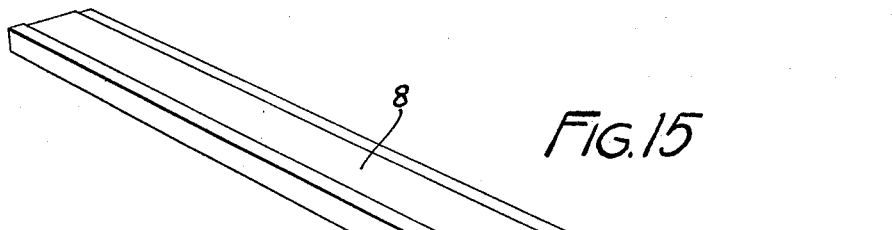
Figure 15 is a perspective of a sill ready for the dadoing operation.
Figure 16:
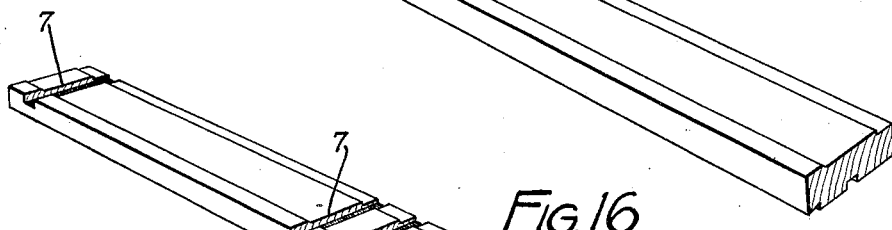
Figure 16 is a similar view showing how the sill is grooved or provided with dadoes wherein the ends of the window frame generally are fitted, this sill being of the type that is used in a mullion window.
Figure 17:
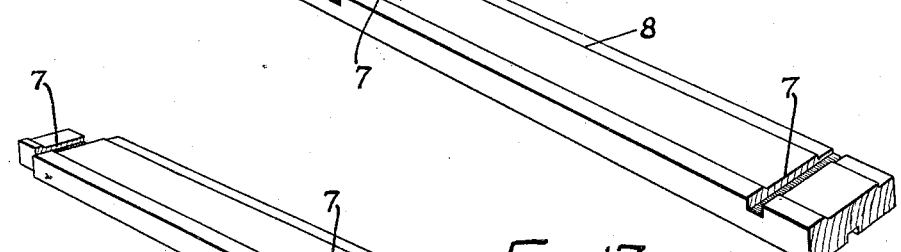
Figure 17 is a similar view showing the appearance of the sill after it has passed through the dadoing and notching operations.

In the drawings 2 represents a suitable frame of proper dimensions for a machine of this character, 3 is a drive shaft operated by a suitable electric motor 4 and mounted in bearings transversely of the machine frame. This shaft is provided at suitable intervals with saws 5 for trimming or squaring the ends of the sills and with suitable cutters 6 by means of which the dadoes 7 are formed transversely in the surface of the sill 8, as indicated in Figure 16, Figure 15 showing the sill as it is formed preparatory to its entrance or delivery to the dadoing mechanism. These saws and the dadoing heads are preferably mounted directly on the driving shaft so there is no intermediate driving mechanism between these saws and heads and the source of power. A shaft 9 is mounted in bearings in the machine frame parallel with shaft 3 and has a pulley 10 driven through a belt 11 from the shaft 3. This is in the nature of a countershaft. A suitable gear reduction mechanism contained within the box 12 connects the shaft 9 with a gear reduction shaft 13 and a belt 14 connects this gear reduction shaft with a comparatively large pulley 15 having preferably a suitable belt tightener 16. From the shaft of this pulley 15 power is transmitted to the operating mechanism as will hereinafter appear.

Figure 1:
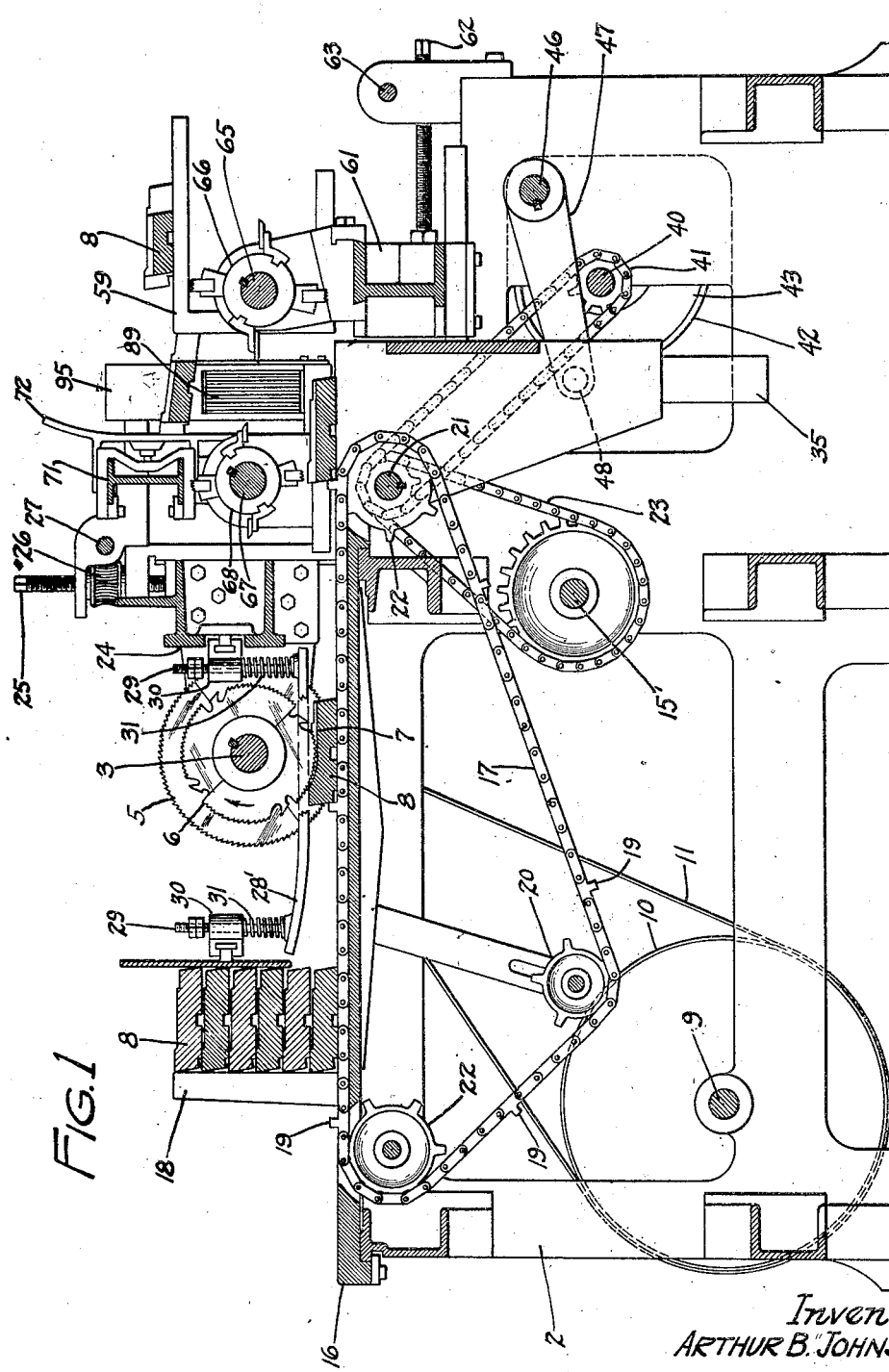
Figure 1 is a longitudinal vertical section of the machine embodying my invention.
Figure 2:
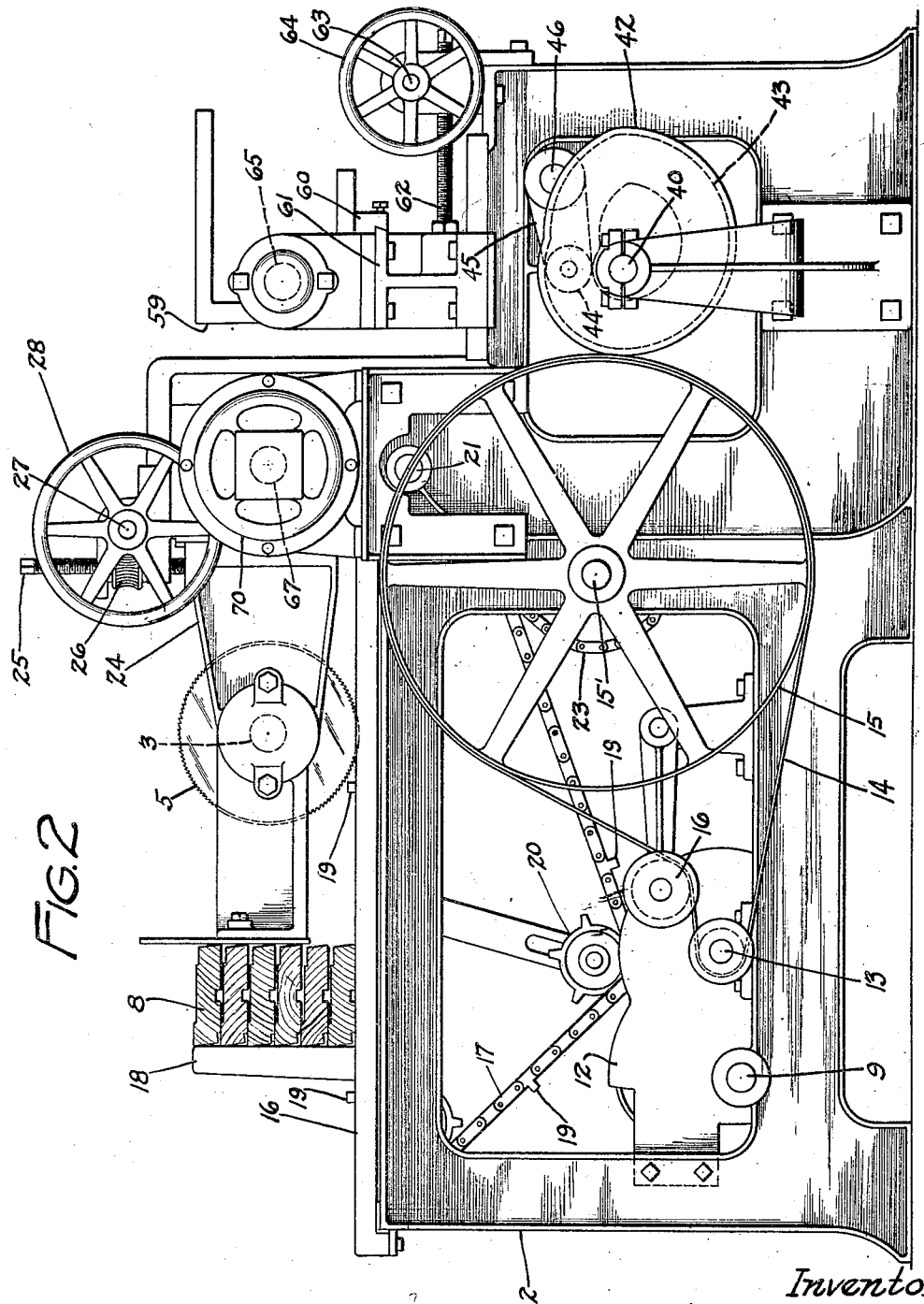
Figure 2 is a side elevation of the machine showing the feed and driving mechanism therefor.
Figure 3:
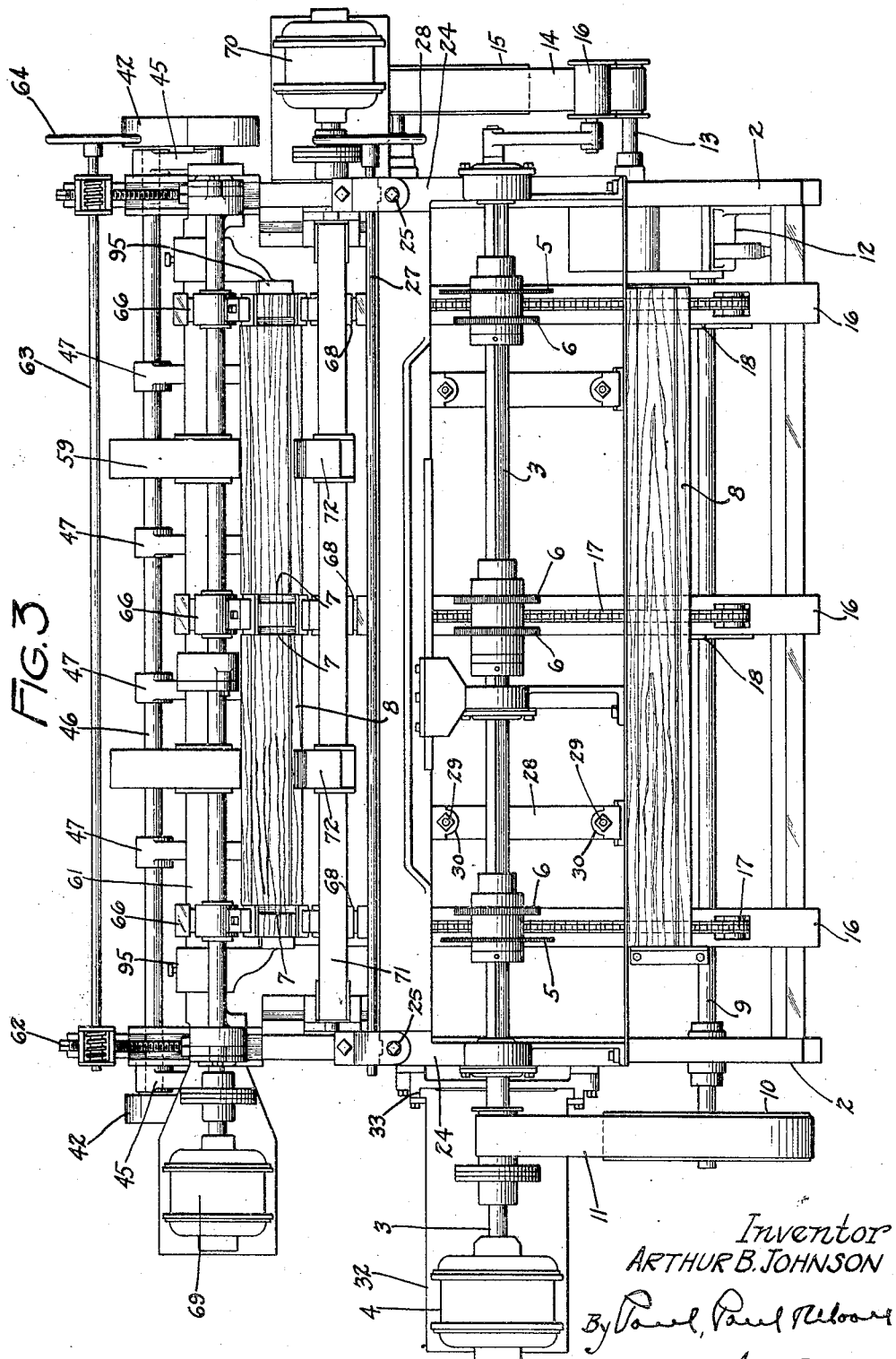
Figure 3 is a plan view of the machine.
Figure 4:
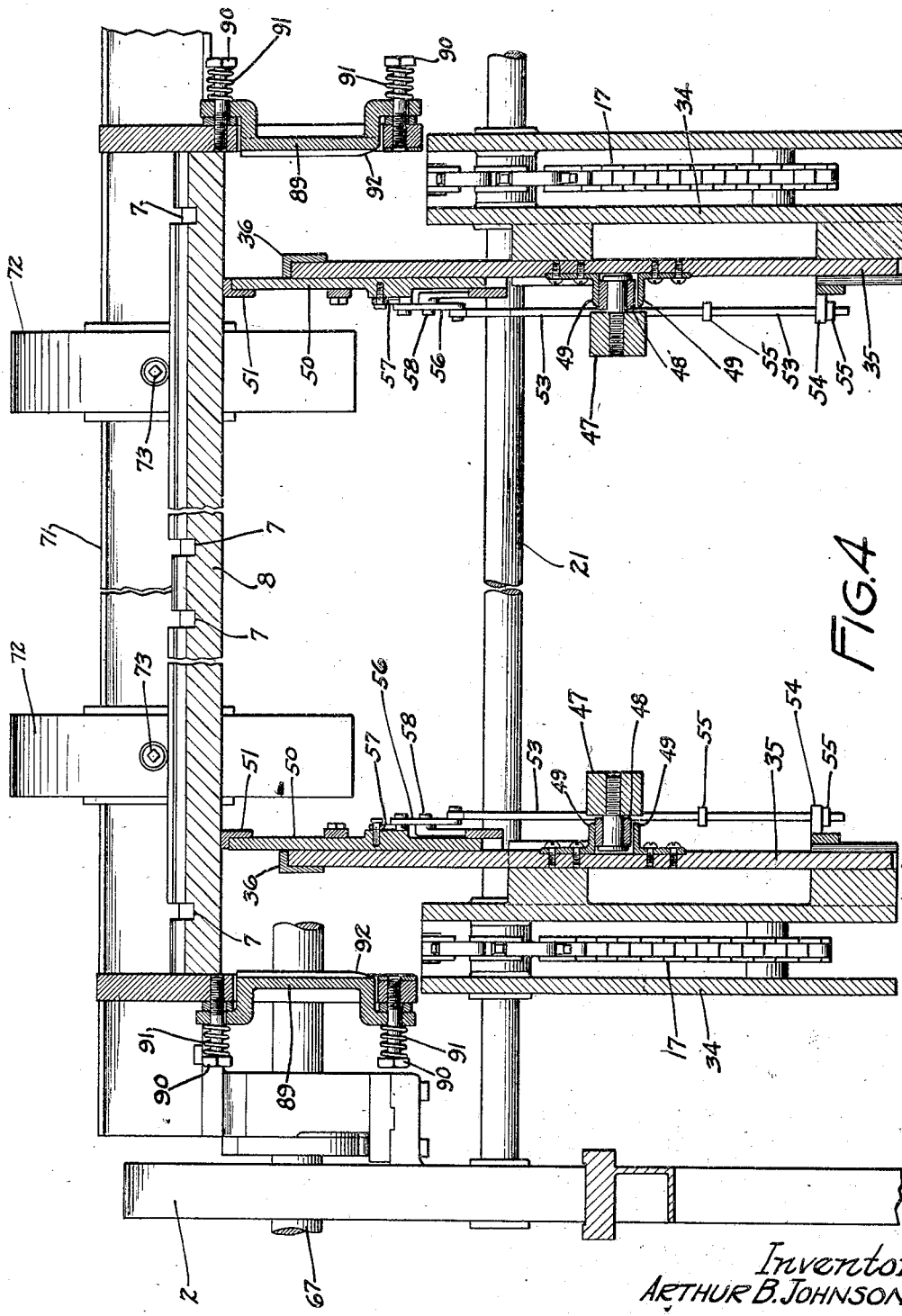
Figure 4 is a sectional view on the line 4—4 on Figure 9 looking in the direction of the arrow.

The top of the machine frame is provided with a series of what I prefer to designate as skids 16 which extend across the machine, and in these skids feed chains 17 are suitably mounted beneath a hopper 18 in which the sills 8 are placed one upon another preparatory to the feeding operation. The feed chains have lugs 19 thereon at intervals which engage the sills as the chains are operated and feed the bottom sill from beneath the others, this movement being edgewise as common to a feeding operation of this kind. A suitable tightener 20 maintains the desired tension on the feed chains and while I have shown three of these chains in the machine it will be understood that I do not confine myself to this number, as it may be increased or decreased according to the length of the sill or other piece of work that is being passed through the machine. A conveyor shaft 21 has suitable sprockets 22 that are engaged by the teeth of the conveyor 17 and a drive belt 23 connects the shaft 15′ to the shaft 21 and insures the operation of the conveyor shaft at a positive universal speed which, of course, may be varied according to the desired feeding speed of the sills. Brackets 24 are mounted for vertical movement by means of threaded rods 25 and worm wheels 26 in engagement with worm shaft 27 having operating wheels 28. The drive shaft 3 is journaled in these brackets for vertical movement therewith and a presserfoot 28′ is provided at intervals and has rods 29 slidable in guides 30 and normally held downward with a yielding pressure by compression springs 31. The bracket 32 on which the motor 4 is mounted being vertically movable in guides 33 to accommodate the vertical adjustment of the drive shaft and as the sills are fed edgewise by the engagement of the lugs on the conveyor chains the presserfeet will bear on the top of the sills and hold them downwardly on the skids with a yielding pressure, and during such holding movement the upper surfaces of the sills are engaged by the saws 5 and the cutting head 6 and the ends of the sills trimmed and the dadoing formed transversely therein. This is a well known operation in a dadoing machine and further detailed description will be unnecessary. After the sills have passed the dadoing cutting heads they are carried along by the conveyor belts and delivered at a point in the machine where the mechanism is located that forms the principal subject matter of this invention and I will now proceed to describe this mechanism in detail. As shown in Figure 1 the dado cutting tools are divided transversely so that when the clamping collars are loosened the saws or cutter may be removed from the heads for sharpening or other purposes.

Referring now to Figures 8 and 9, a conveyor shaft 21 is shown having bearings for the conveyor chain skids over which the sills are fed lengthwise by the chains after the dadoing operation has been performed. Vertically arranged guides 34 are provided at intervals beneath the skids and in these guides slides 35 are mounted having freedom of vertical movement and there may be a series of these guides and slides across the machine to adapt it for sills or other work of varying length. Angle plates 36, which I prefer to designate as primary tables, are pivoted at 37 on the upper ends of the slides and are adapted to receive the sills delivered thereto by the conveyor chains. These tables have transverse slots 38 therein to receive bolts 39 having suitable nuts by means of which bolts the tables may be tilted on their pivots for the purpose of supporting the sills at an incline when this is desired, as will hereinafter appear. A shaft 40 has a belt connection 41 with the conveyor shaft 21 to be driven thereby and a cam 42 is secured on each end of said shaft, each cam having a cam track 43 to receive a roller 44 on a short arm 45 that is secured to a shaft 46. A longer arm 47 is secured to the shaft 46 and has a roller 48 that is adapted to ride between horizontal guides 49 on the slide 35 so that when the shaft 46 is rocked by the movement of the cam 42 a corresponding movement will be imparted to the arm 47 to move the slide 35 vertically in its guides. There will, of course, be as many arms 47 provided as there are vertical slides 35 in the machine, these being arranged at intervals across the machine to adapt it for the different purposes for which it may be desired. A smaller auxiliary slide 50 is provided to move in guides on the main slide and an auxiliary plate or table 51 is pivoted on the auxiliary slide and provided with a slot and bolt adjusting means 52 to provide for tilting the auxiliary table at different angles to the horizontal as may be desired in the operation of the guide. The longitudinal edges of the sills are beveled or are in a plane that is diagonal to the plane of the sill and to provide for a corresponding bevel or incline in the bottom of the notches cut transversely in the longitudinal edges of the sills, it is necessary that the sills be tilted before being engaged by the notch cutting heads and for this purpose the plates or tables 36 and 51 are mounted for adjustment so that they can be tilted conveniently on their pivots and set at any desired angle to the horizontal according to the degree of bevel on the edges of the sills. The manner of making these tables adjustable is comparatively simple and inexpensive but, of course, other means may be provided for this purpose if desired. A rod 53 is slidable in a guide 54 and is provided with stops 55 for limiting its movement and an arm 56 is pivoted at one end to the upper end of the rod 53 and has a link connection 57 at its other end with the auxiliary slide 50 and is pivoted at an intermediate point 58. By means of these connections the auxiliary slide and the plate 51 thereon will be actuated when the lower stop 55 engages the guide 54 and this will take place when the main slide has nearly reached the limit of its upward stroke, being actuated by the arm 47. At this time the auxiliary slide and plate will through their connections with the rod 53 begin to move faster than the main slide, so that when the main slide has reached the limit of its stroke, as shown in Figure 9, the auxiliary slide and plate will have advanced to the point indicated by full lines in Figure 9, terminating its stroke at the same time as the main slide, both being actuated through the arm 47.

During the period of fastener movement of the auxiliary slide and its plate the sill or other piece of work will be raised up beyond the cutter heads to the point indicated by full lines in Figure 9 where the work will be held and prevented from falling back by gravity when the slides are withdrawn by the toothed mechanism which will hereinafter be described in detail. A stop 59 is provided in the path of the sill against which its forward edge is seated and blocks 60 support these stops and are adjustable transversely of the machine on brackets or cross girts 61 which in turn are adjustable lengthwise of the machine or toward or from the direction of movement of the sills by means of threaded rods 62 and a worm shaft 63 having a suitable operating wheel 64. The shaft 65 is journaled in bearings to move with the stops 59 and on this shaft notching or cutting heads 66 are mounted and provided with the well known cutting tools that are common to cutting heads of this kind. A shaft 67 is arranged in parallel relation to the shaft 65 and carries another set of notching or cutting heads 68, the shaft 65 being driven from a suitable motor 69 on one side of the machine and a similar motor 70 on the opposite side of the machine having suitable driving connection with the shaft 67. By means of the lateral adjustment on the shaft 65 the space between the opposite cutter heads on these shafts may be increased or decreased as desired according to the width of the stock that is fed between them, and also according to the depth of the notches that it is desired to cut in the longitudinal edges of the sills or other articles fed between them. The face of the stop 59 forms a vertical surface on which the edge of the sill may slide and a bracket or cross beam 71 supports a vertical guide 72 that has an adjusting means 73 for moving it in and out and between these guides. The work is fed vertically when the slides 35 are raised and during this upward sliding movement the cutting heads notch the longitudinal edges of the sills at the desired intervals.

For moving the sills against the stops 59, after passing out of engagement with the conveyor chains, I provide dogs 74 pivoted at 75 in slides 76 that are mounted in the vertical faces of the conveyor chain skids. These dogs have forward ends 77 to engage the rear edges of the sills and also have notches 78 to receive pins 79 on the slides, the pins limiting the downward movement of the rear ends of the dogs but permitting their forward ends to be tilted sufficiently above the skids 16 to prevent any backward movement of the sills after they have passed over the dogs, a sufficient tilting movement of the dogs being of course provided to allow freedom of slide movement of the sills over them to their seats against the stops 59 preparatory to the vertical movement. The normal position assumed by the sills after passing out of engagement with the conveyor chains is indicated by full lines in Figure 5, the dog being indicated in dotted lines as having returned to its normal position after the passage of the sill thereover. To move the sill automatically to its seat against the stops 59, I prefer to provide a mechanism consisting of an arm 80 having a pin and slot connection 81 at its upper end with the slide 76 and pivoted at 82 to the guide 34. This arm has a bill crank extension 83 at its lower end provided with a weight 84 which normally tends to tilt the upper end of the arm 80 toward the right and move the slide in a corresponding direction. A lever 85 is pivoted at a point intermediate of its ends to a bracket 86 and its lower end has a link connection 87 with the arm 80. A cam 88 is mounted on the shaft 21 in position to engage the lever 85 and pressure of the cam on this lever will operate to move the arm 80 toward the left or in a direction opposite to that of the movement imparted to it by the weight 84. The movement of this cam or the series of cams that may be on the shaft 21 will be synchronous with the travel of the conveyor chains, the delivery of the sills to the tables and the vertical movement of the slides 35 in their guides and hence when a sill has passed over the dogs 74 the movement of the cams 88 will advance the slides toward the right and engage the dogs with the rear edges of the sills and press them firmly against the stops 59 where they will be positioned upon the vertically movable tables ready for such vertical movements when the slides supporting these tables are actuated. The slides and their associated parts form a secondary feeding means for the work.

The sills are held firmly against longitudinal movement by means of corrugated plates 89 yieldingly held towards the ends of the sills by means of bolts 90 having compression springs 91 interposed between the heads of the bolts and the ends of the corrugated plates, the corrugations and bevelled lower ends 92 allowing the sills to be easily pressed upwardly between them and the ribs of the corrugations engaging the ends of the sills will hold them firmly during the operation of cutting the notches in the longitudinal edges of the sills. I also prefer to provide arms 93 having teeth 94 positioned to engage the ends of the sills and supported on brackets 95 that are adjustable on the cross girts 61 so that the brackets can be moved back and forth to adapt them for sills of different length. The arms 93 are formed preferably of spring material so that they will permit freedom of vertical movement of the sills but when the sills have once moved past the teeth 94 then these teeth will prevent downward movement of the sills and any interference with the notching operation of the sills beneath.

Figure 18:
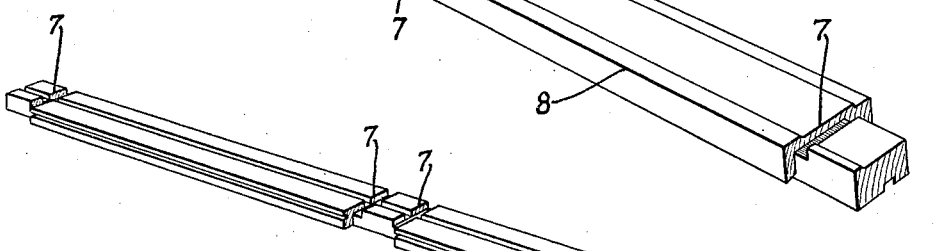
Figure 18 illustrates the head jamb of a window frame provided with dadoes and notches similar to those in the sill at the bottom of the window.

In the operation of the machine the sills or jambs to be notched are placed one above the other in the hopper, as indicated in Figure 1, and the operation of the feed belt will carry the sills forward to the heads, having the means for cutting the dadoes in the surface of the stock, and when this dado cutting operation has been performed the forward movement of the stock will continue until it reaches a point on the skids where it is in position to be engaged by the dogs 74, the sills or jambs having moved over the upwardly projecting ends of these dogs and reached a point adjacent the path of the vertically moving slides. At this time the cams 88 will become operative and the dogs 74 and their supporting slides operated to push the sills edgewise against the stops 59 as indicated in Figures 5 and 6. When this has been done the sills will be directly in line with the reciprocating slides beneath. If the machine is working on material like a head jamb of a window where the longitudinal edges are straight with no bevel, then the tables 36 and 51 will be set in a horizontal position; but if the machine is working on sills as indicated in the drawings with longitudinal beveled edges, then these supporting tables will be adjusted as indicated in Figures 8 and 9 so that the sill will lie at an incline thereon with its longitudinal edges in vertical planes so that when the cutting heads engage these longitudinal edges the planes of the bottoms of the notches will be parallel with the planes of the longitudinal edges. The slides supporting the tables 36 and 51 move together and to insure the movement of the stock away from the cutter heads when the notching operation has been completed the auxiliary slide and its table have a longer travel than the main slide and table, this being accomplished by providing a faster rate of travel of the auxiliary slide and its table. This additional movement or stroke of the auxiliary slide will carry the sill or jamb up to a point well above the cutter heads as indicated in Figure 9 where the dogs 93 will prevent the work from dropping back onto the cutter heads upon the return or downward stroke of the slides. The next sill or jamb will push the first one up still further until it reaches a point where it is discharged by gravity upon the support 59 as indicated by full lines in Figure 1. An attendant will remove the sills from the support 59 as they accumulate thereon. Whenever it is desired to change the bevel of the bottoms of the notches in the edges of the stock, the tables 36 and 51 may be readjusted to vary their angle to the horizontal and thus adapt the position of the sills on the supporting tables so that the bottom of the notches will always be substantially parallel with the planes of the longitudinal edges of the work. It will be understood that any desired number of dadoes and notches may be cut in the work, depending upon the style of window and length of the sill or jamb, and when the machine is working on a jamb such as shown in Figure 18, the plates, or tables, so-called, will be horizontal, it being unnecessary to provide for tilting of the work except when notches are to be formed in the beveled edges of sills.

In various ways the details of construction herein shown and described may be modified and still be within the scope of my invention.

I claim as my invention:

1. In a machine of the class described, the combination with means for feeding the work edgewise in a horizontal direction and revolving cutters for forming dadoes transversely in the surface of the work, means for receiving the work from said dado cutters and moving it vertically, means for placing the work preparatory to its vertical movement and cutter heads for forming transverse notches in the longitudinal edges of the work intersecting the dadoes therein.

2. The combination with means for cutting dadoes transversely in the surface of a piece of work and means for feeding the work edgewise of a vertically moving support adapted to receive the work, means operating subsequent to said edgewise feeding means for advancing the work upon said support and holding it thereon, and means for cutting transverse notches in the edges of the work upon said vertically moving support.

3. The combination with the revolving cutter heads for forming dadoes in the surface of the work, of a means for feeding the work edgewise to said cutter heads, a support adapted to receive the work from said cutter heads, means for tilting the work on said supports, means for raising said support and notching heads provided in the path of the vertical movement of the work on such supports.

4. The combination with means for forming dadoes in the surface of the work, of supports whereto the work is delivered from said dado forming means, means for tilting said supports to vary the angle of the work thereon to the horizontal, means for raising said supports and notching heads mounted in the path of the work on said supports.

5. The combination with means for forming dadoes in the surface of the work and skids whereon the work is moved edgewise, vertical guides adjacent said skids, means mounted in said skids and having a reciprocating movement to engage the work and push it against said guides, reciprocating means for raising the work and cutter heads provided in the path of the work for forming notches in the longitudinal edges thereof.

6. The combination with means for cutting dadoes in the surface of the work, and skids whereon the work is moved edgewise, of means mounted to reciprocate in said skids and having dogs engaging the work, upright guides in the path of the work against which it is pushed by said dogs, means for raising the work while held against said guides, and notching heads mounted in the path of the work.

7. The combination with means for cutting dadoes in the surface of the work, of a vertically movable slide whereto the work is delivered, an auxiliary slide operating to raise the work beyond the limit of stroke of the main slide, and notching heads mounted in the path of the work during such vertical movement.

8. The combination with means for forming dadoes in the surface of the work, of reciprocating, main, and auxiliary slides whereto the work is delivered, mechanism for raising said slides simultaneously, notching heads in the path of the work on said slides and means for moving said auxiliary slide beyond the limit of travel of the main slide, for the purpose specified.

9. The combination with means for forming dadoes in the surfaces of the work, of plates whereto the work is delivered from said dado forming means, means for tilting said plates to vary the angle of the work with respect to the horizontal, means for raising said plates vertically, and notching heads mounted in the path of the vertical movement of said plates.

10. The combination with means for feeding the work horizontally, of supports whereto the work is delivered, means for raising said supports vertically with the work thereon, said supports being pivoted at one end and having a pin and slot adjustment at the opposite end whereby said supports may be tilted to change the angle of the work to the horizontal, and notching heads mounted in the path of the work on said supports.

11. The combination with means for feeding the work horizontally, of vertically reciprocating slides, plates mounted on said slides and having means for tilting them to vary their angle to the horizontal and on which plates the work is delivered, and notching heads arranged above said slides in the path of the work thereon.

12. The combination with the main and auxiliary slides and mechanism for reciprocating them vertically, of means for feeding the work to said slides, tilting supports carried by said slides and whereon the work is held, and notching heads mounted in the path of the work above said slides.

13. The combination with vertically reciprocating main slides and auxiliary slides carried thereby and whereto the work is delivered, means for raising said main slides and mechanism whereby when said main slides approach the limit of their movement said auxiliary slides will be accelerated to travel beyond said main slides, and notching heads mounted in the path of the work on said slides.

14. The combination with the main slides and the auxiliary slides carried thereby, of tilting supports mounted on said main and auxiliary slides and thereto the work is delivered, said tilting supports holding the work at an angle to the horizontal, mechanism for raising said main slides and accelerating the travel of said auxiliary slides when said main slides are near the limit of their stroke, and notching heads mounted in the path of the work on said slides.

15. The combination with vertically reciprocating members and means for delivering the work thereto, of mechanism for raising said members and accelerating the travel of certain of said members at a predetermined point in their stroke, and notching heads mounted in the path of the work on said members.

16. The combination with reciprocating main and auxiliary members and means for delivering the work thereto, of mechanism for raising said main members a predetermined distance and simultaneously imparting a corresponding movement to said auxiliary members, mechanism for accelerating the travel of said auxiliary members when near the limit of the stroke of said main members whereby said auxiliary members will travel beyond said main members and stop at the same time, and notching heads mounted in the path of the work on said members.

17. The combination with reciprocating main and auxiliary members and means for delivering the work thereto, of mechanism for raising said main members a predetermined distance and simultaneously imparting a corresponding movement to said auxiliary members, mechanism for accelerating the travel of said auxiliary members, when near the limit of the stroke of said main members whereby said auxiliary members will travel beyond said main members and stop at the same time, notching heads mounted in the path of the work on said members, and means for engaging the work and preventing it from falling back onto said notching heads when said auxiliary members are withdrawn.

18. The combination with horizontal guides and means for moving the work thereon, of upright guides in the path of the work, reciprocating slides having dogs to engage the work and move it against said upright guides, pivoted arms connected with said slides and having normally tending to move said slides towards said upright guides, levers connected with said pivoted arms, cams engaging said levers to move said slides backwardly from said upright guides at a predetermined period and reciprocating means for engaging the work and moving it vertically while contacting with said upright guides, and notching heads mounted in the path of the work.

19. The combination with reciprocating slides and means for delivering the work thereto, of notching heads mounted in the path of the work on said slides, and guides having ribbed faces yieldingly mounted and positioned to engage the ends of the work and hold it during the engagement of the notching heads therewith.

20. The combination with means for feeding the sills horizontally of vertically reciprocating slides and means for holding the sills thereon, guides between which the sills are moved vertically, notching heads in the path of the work, means for accelerating the travel of said sills during the latter part of their movement, means for preventing the sills from falling back onto said notching heads when the notching operation has been completed, and means for receiving the completed sill.

21. The combination with means for feeding window sills horizontally and cutting dadoes transversely in the surfaces thereof, of vertically reciprocating means whereto the sills are delivered, means for tilting the sills on said reciprocating means to vary their angle to the horizontal, guiding means for the sills during their vertical movement, notching heads in the path of the sills for forming notches in the longitudinal edges thereof in register with said dadoes, and means for accelerating the travel of the sills during the latter part of their vertical movement.

22. The combination with vertically reciprocating means and mechanisms for delivering sills or other articles thereto, of means for notching the longitudinal edges of the work during such vertical movement, and mechanism for accelerating the movement of the work and raising it out of the path of said notching operation for the purpose specified.

23. The combination with vertically reciprocating means and mechanisms for delivering the work thereto, of means for cutting transverse notches in the longitudinal edges of the work, members mounted on said reciprocating means, and mechanism connected with said members for accelerating the movement thereof when said reciprocating means is near the limit of its stroke and thereby rapidly moving the work out of the path of said notch cutting means.

24. The combination of the main reciprocating members and means for delivering the window sills or jambs thereto, with auxiliary reciprocating members carried by said main members and having a limited movement independently thereof, means for notching the longitudinal edges of the work during the vertical movement of said reciprocating means, a rod and stop therefor for said auxiliary reciprocating members, and a lever mechanism connecting said rod with said auxiliary reciprocating members whereby when movement of said rod is checked said auxiliary members will be operated faster than said main reciprocating members at and during a predetermined period of the stroke.

25. In a machine of the class described, a hopper wherein the pieces of work are piled one upon another, a belt having lugs thereon to engage the bottom piece of work and advance it horizontally out of the pile, vertical guides against which the work is seated at the end of such horizontal movement, a support for the work having a vertical plunger movement, an arm connected with said support, a shaft whereon said arm is mounted, a cam having means for oscillating said shaft and arm to raise and lower said support, and a notching head against which the work is moved.

26. In a machine of the class described, a hopper wherein the pieces of work are piled one upon another, a belt having lugs thereon to engage the bottom piece of work and advance it horizontally out of the pile, vertical guides against which the work is seated at the end of such horizontal movement, a plunger support wheron the work has a vertical movement, means connected with said support for positively raising and lowering it, and notching heads in the path of the work on said support.

27. In a machine of the class described, means for feeding the pieces of work horizontally, means for forming dadoes transversely in the surface of the work, a support having a vertical plunger-like reciprocating movement for receiving the pieces of work, notching heads to which the work is moved vertically by said support, and means adapted to prevent the pieces of work from following said support on its down stroke, said means comprising a member having teeth thereon to engage the work.

28. In combination with means for forming a dado, means for feeding pieces of work in spaced relation edgewise in a manner to be cut on one surface by said dado-forming means, a vertical guide against which the edge of each piece of work is engaged by said feeding means after the dado is formed, means above the feeding means for forming a notch which intersects the dado, means for raising and holding the work in a position to be operated on by the notching means after the work has engaged the vertical guide, and means acting to prevent downward movement of the piece after notching and when the work-raising means is retracted.

29. In a machine of the class described, the combination of means adapted for feeding sills or jambs edgewise in a horizontal direction, a cutter for forming a dado transversely in one surface of the sills or jambs, means upon which the sills or jambs are placed by the feeding means after the dado cutter is operated, for moving the sills or jambs vertically, and a cutter arranged to form a notch to intersect the dado, as the sills or jambs are moved vertically, said feeding means being arranged to feed each sill or jamb separately and in spaced relation relative to the following sill or jamb.

30. In a machine of the class described, the combination with means for feeding the work, of revolving cutters for forming dadoes transversely in the surface of the work, means for receiving the work from said dado cutters and moving it at an angle to its initial movement, and cutter heads for forming transverse notches in the longitudinal edges of the work intersecting the dadoes therein.

31. The combination with means for feeding window and door sills, of means for cutting dadoes transversely in the surfaces of the sills, means for subsequently moving the sills at an angle to their initial movement, means for cutting transverse notches in the longitudinal edges of the sills during such subsequent movement and means for tilting the sills preparatory to the notch-cutting operation.

32. In a machine of the class described, the combination with means for feeding the work in a horizontal direction and means for forming dadoes transversely in the surface of the work, of a secondary feeding means forming a horizontal continuation of said first named feeding means and adapted to receive the work therefrom following the dado forming operation and move it a predetermined distance horizontally, means upon which the work is positioned by said secondary feeding means for moving it vertically, and means for forming transverse notches in the longitudinal edges of the work during such vertical movement.

33. The combination with means for feeding sills and jambs edgewise horizontally and cutting dadoes transversely in the surfaces thereof, of a secondary feeding means forming a continuation of said first named means and adapted to receive the work therefrom and impart a positive movement to each piece separately, means positioned to receive the work from said secondary feeding means and move it at an angle thereto and means for notching the edges of the work during such movement.

34. The combination with means for cutting dadoes in the surface of the work and feeding it transversely in a horizontal direction, of a secondary feeding means forming a continuation of said first named means and adapted to receive the work therefrom and impart a positive movement thereto, means operating at an angle to said secondary feeding means and whereon each piece is deposited separately in spaced relation by said secondary means, and means for cutting the edges of the work during the angular movement thereof.

35. In a machine of the class described, means for feeding the sills and jambs edgewise horizontally, means for forming dadoes transversely in the surfaces of the sills and jambs, a secondary feeding means adapted to receive the work and move each piece separately in a direction corresponding to the movement of said first named feeding means, means positioned to receive each piece of work separately from said secondary feeding means, and move it at an angle thereto and means for cutting notches in the work during such angular movement.

36. The combination with means for feeding the work and cutting a dado in a surface thereof, of means for notching a longitudinal edge of the work, and means whereby the work may be tilted preparatory to the notching operation and means for delivering the work from said initial feeding means to said tilting means.

37. The combination with means for forming a dado, of means for initially feeding pieces of work edgewise horizontally to be cut by said dado forming means, a cutter arranged to notch a longitudinal edge of the work, means for feeding the work to said cutter, means for receiving the work from said initial feeding means and delivering it to said cutter feeding means, said horizontal and cutter feeding means being arranged to feed each piece of work separately and in spaced relation to the following piece of work.

38. The combination with means for feeding the work edgewise and cutting a dado therein, of a cutter for notching a longitudinal edge of the work, and means for feeding the work to said cutter and holding it in a tilted position with respect to its original feeding movement.

In witness whereof, I have hereunto set my hand this 8th day of November, 1927.

ARTHUR B. JOHNSON.